(12) United States Patent
Abbabathula et al.

(10) Patent No.: US 12,429,366 B2
(45) Date of Patent: Sep. 30, 2025

(54) CORRUPTED SENSORS DETECTION IN SENSOR CONSORTIUM

(71) Applicant: Accenture Global Solutions Limited, Dublin (IE)

(72) Inventors: Satyasai Srinivas Abbabathula, Bangalore (IN); Nataraj Kuntagod, Bangalore (IN); Sanjay Podder, Thane (IN); Venkatesh Subramanian, Bangalore (IN); Kuntal Dey, Rampurhat (IN); Senthil Kumar Kumaresan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 472 days.

(21) Appl. No.: 17/949,778

(22) Filed: Sep. 21, 2022

(65) Prior Publication Data

US 2024/0094034 A1 Mar. 21, 2024

(51) Int. Cl.
*G01D 9/12* (2006.01)

(52) U.S. Cl.
CPC ................................ *G01D 9/12* (2013.01)

(58) Field of Classification Search
CPC ........................................................ G01D 9/12
See application file for complete search history.

(56) References Cited

U.S. PATENT DOCUMENTS

| | | | | |
|---|---|---|---|---|
| 5,602,732 | A * | 2/1997 | Nichols | G01D 3/08 |
| | | | | 123/376 |
| 2016/0011023 | A1* | 1/2016 | Hsieh | G01F 15/063 |
| | | | | 73/861.79 |
| 2016/0178414 | A1* | 6/2016 | Saha | G05B 23/0216 |
| | | | | 702/188 |
| 2017/0184416 | A1* | 6/2017 | Kohlenberg | G01D 3/08 |
| 2018/0313799 | A1* | 11/2018 | Cheng | G01N 15/06 |
| 2019/0353502 | A1* | 11/2019 | Doshi | G01D 21/00 |

* cited by examiner

*Primary Examiner* — Lisa M Caputo
*Assistant Examiner* — Sharah Zaab
(74) *Attorney, Agent, or Firm* — Polsinelli PC

(57) ABSTRACT

A method for detection of a corrupted sensor including providing a first sensor; identifying one or more correlating sensors to the first sensor; determining a correlation between the first sensor and the correlating sensors according to historical sensor values; obtaining a calculated value of the first sensor based on values of the correlating sensors and the correlation; obtaining a measured value of the first sensor; and determining whether the first sensor is corrupted according to a difference between the calculated value and the measured value of the first sensor.

18 Claims, 7 Drawing Sheets

CORRUPTED SENSORS DETECTION IN SENSOR CONSORTIUM

TECHNICAL FIELD

This disclosure relates to detection of corrupted sensors among a consortium of sensors.

BACKGROUND

Internet of Things (IOT) has been widely used in daily life. An IOT system may include a plurality of sensors in order to detect the condition of the environment for specific applications. The sensors in a system may include different types. For example, a gardening system may include multiple moisture sensors to detect the moisture in the soil. However, the sensors of an IOT system may be installed in different kinds of application environments. It is likely that some sensors may be corrupted due to the age of the sensor or due to the harsh environment of installation. Detecting the corrupted sensors becomes an issue for technicians.

DETAILED DESCRIPTION

Figure 1:
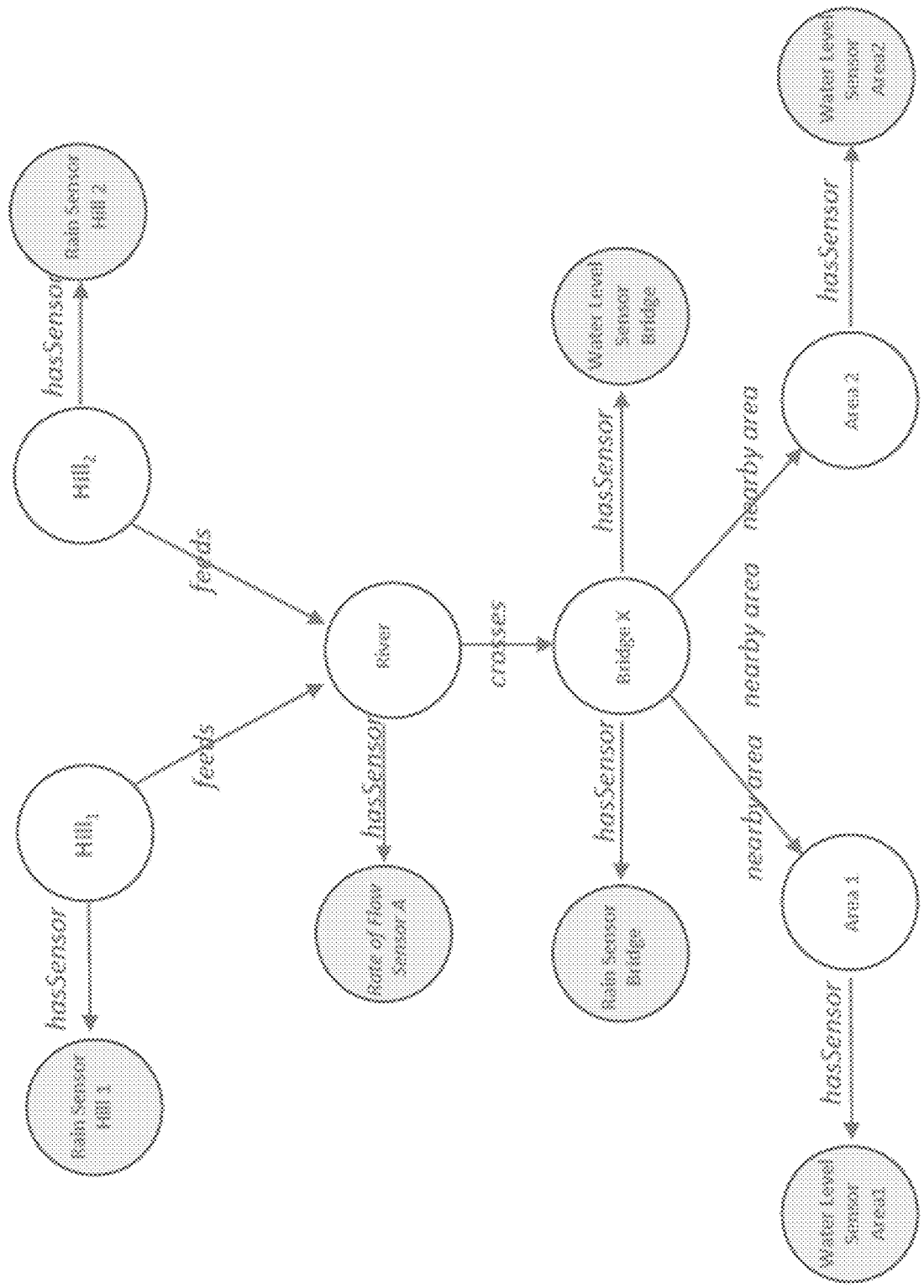
FIG. 1 shows an example of a knowledge graph representation of a sensor consortium.

FIG. 1 shows an example of a sensor consortium represented in a knowledge graph format. In IOT applications, sensors are generally not deployed in silos; instead, an IOT system may include a sensor consortium, including a plurality of sensors, likely of different types. Additionally, the reading of these deployed sensors may have some dependency. Using FIG. 1 as an example, FIG. 1 shows the consortium of sensors deployed at Hill 1, Hill 2, River, Bridge X, Area 1, and Area 2. As an example, Rain sensors are deployed at Hill 1, Hill 2, Bridges X. A flow rate sensor is deployed at the River to measure the flow rate of the river. Water level sensors are respectively deployed at Area 1, Area 2, and Bridge X. Below shows an example programming/data structure that can be used for each sensor.

```
Hill 1:
    Static: Name, Place, Location
    Measured (Sensor):
        RF_HILL = Rainfall at Hill(mm)
    Calculated:
        RF_HILL_CAL =Fn1 (WF_RIVER)
River:
    Static: Name, Length (km)
    Measured (Sensor):
        WF_RIVER = Rate of Water Flow in River (cubic feet)
    Calculated:
        WF_RIVER_CAL = Fn2 (RF_HILL_1, RF_HILL_2)
Bridge X:
    Static: Location, Distance from Hill, Elevation
    Measured (Sensor):
        WL_BRIDGE = Water Level at Bridge (feet),
        RF_BRIDGE = Rainfall (mm)
    Calculated:
        WL_BRIDGE_CAL =Fn3 (WF_RIVER, RF_BRIDGE)
Area 1:
    Static: Name, Pin Code, Elevation, Coverage (Sq. Km),
    Drainage Infrastructure Status = GREEN
    Measured (Sensor):
        WL_AREA1 = Water Level at Area1 (feet),
    Calculated:
        WL_AREA1_CAL = Fn4 (WL_BRIDGE, DRAINAGE_STATUS_A1)
Area 2:
    Static: Name, Pin Code, Elevation, Coverage (Sq. Km),
        Drainage Infrastructure Status = RED
    Measured (Sensor):
        WL_AREA2 = Water Level at Area2 (feet),
    Calculated:
        WL_AREA2_CAL = Fn5 (WL_BRIDGE, DRAINAGE_STATUS_A2)
```

As described above, there may be a measured value of each sensor, and there may be a calculated value of each sensor. Also, the calculated value can be a function of a measured value(s) of correlating sensors, a calculated value of a correlating sensor, or a status of sensor of the calculated value.

The arrows and corresponding texts in FIG. 1 show the relationships between different locations/sensors. Because the rainfall at Hill 1 and Hill 2 may feed into the River due to their geographic nature, there is a correlation between the amount of rainfall detected by the rain sensors at Hill 1 and Hill 2 and the flow rate detected by the flow rate sensor of the River. For example, it is expected that the detected rainfall by the rain sensor at Hill 1 and Hill 2 has a positive correlation to the flow rate detected by the flow rate sensor of the River. Also, assuming the Bridge X is located across the River, it is expected that the water lever sensor of the bridge may has a positive correlation to the rain sensors at Hill 1 and Hill 2 and a positive correlation to the flow rate sensor of the River. Also, due to the proximity of the Bridge X and the Hill 1 and Hill 2 (as indicated by "nearby area"), the reading of the rain sensors at these proximate areas may have a positive correlation. Assuming Area 1 and Area 2 are proximate to Bridge X, the water level sensors at Area 1 and Area 2 are expected to have a positive correlation to the rain sensors and the water level sensor at Bridge X. The correlations describe above are just example. The correlation in other applications or arrangements may depend on the natures of the deployed sensor. It is possible to have a negative correlation among sensors.

It is possible to use these correlations to check whether there is any corrupted or tampered sensor or sensor in a fault condition. For example, if the correlation between a specific sensor to be checked and some correlating sensors can be ascertained, a calculated value of the specific sensor can be obtained by calculation based on the measured or calculated value of the correlating sensors. The calculated value of the specific sensor can be used to compare with the actual measured value to determine if the measured value is somehow consistent with the calculated value.

The correlation can be ascertained according to historical measured values and/or calculated values of the specific sensor to be checked and of the correlating sensors. Further, the system can set up a threshold, and assume that, if a sensor is not corrupted, the difference between the calculated value and the measured value of a specific sensor is within the range of the threshold. For example, the system can assume that |Sm,cal−Sm,mes|<threshold in a normal condition of the specific sensor, where Sm,cal is the calculated value of the specific sensor, and Sm,mes is the measured value of the sensor.

To reach a conclusion that the specific sensor is corrupted, the system may first determine whether the calculated value is reliable. For example, the system may first check whether the working condition of the correlating sensors, whose values is used to calculated value of the to-be-checked sensor, is normal and reliable.

There may be some challenges in the approach described above. For example, in smart city or industrial IOT environments, there may be plethora of sensors of heterogenous types. The number of the sensors can be millions, deployed at distant location in vary harsh environment. Therefore, a static knowledge graph is not sufficient to denote the correlation of different sensors due to the complexity and dynamic nature in the systems. For example, sensors may be replaced frequently, and new sensor may be added or removed for various reasons. Likewise, the correlation between the sensor can be very dynamic in nature. Additionally, the reading of the sensors may drift overtime along with the age of the sensors, so the correlation is not a fix value. A dynamic builder that can keeps updating the inter sensor correlation models may be implemented to mitigate the challenges.

According to one embodiment, this disclosure provides a method for detection of a corrupted sensor, including:
providing a first sensor;
identifying one or more correlating sensors to the first sensor;
determining a correlation between the first sensor and the correlating sensors according to historical sensor values;
obtaining a calculated value of the first sensor based on values of the correlating sensors and the correlation;
obtaining a measured value of the first sensor; and
determining whether the first sensor is corrupted according to a difference between the calculated value and the measured value of the first sensor.

Figure 2:
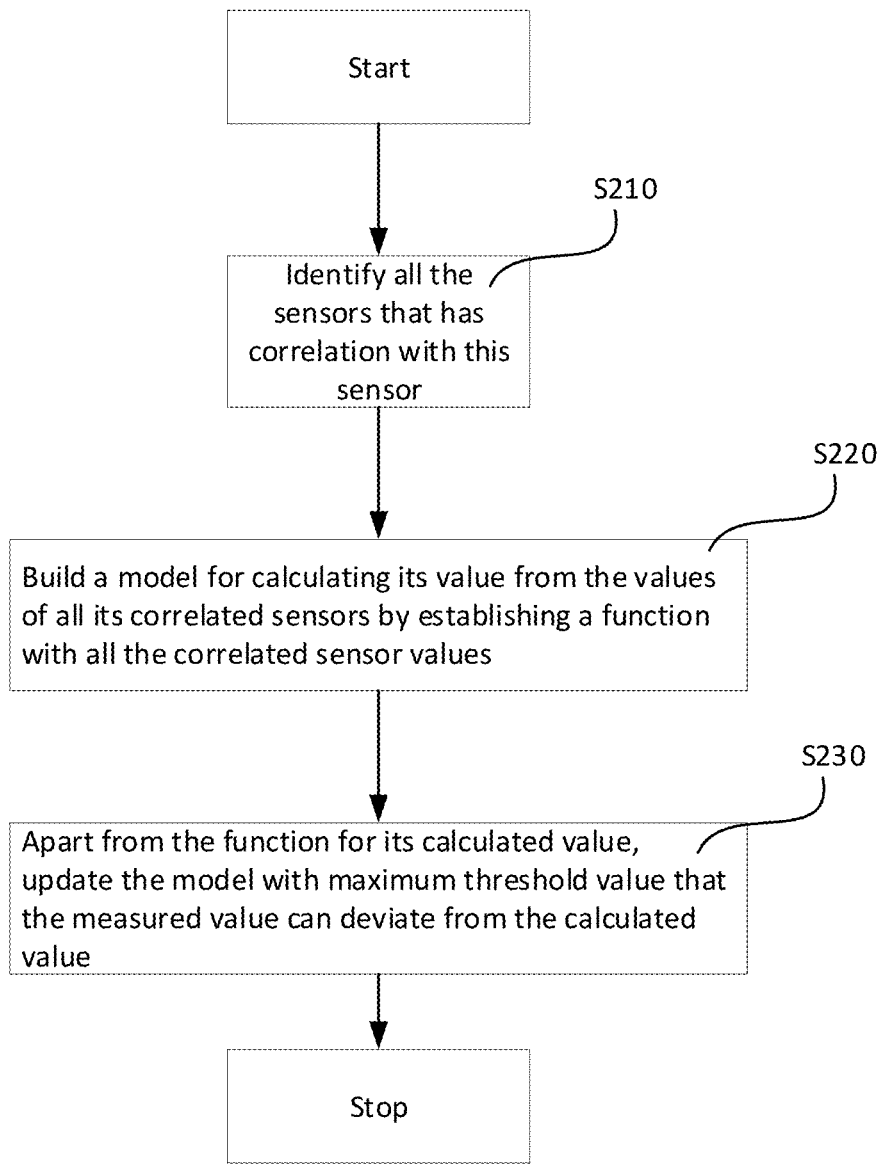
FIG. 2 shows a flow chart for establishing dynamic inter sensor correlation models.

A flow chart for establishing dynamic inter sensor correlation models is illustrated in FIG. 2. Specifically, the flow chart includes the following steps:
S210: Identify all the sensors that has correlation with this sensor;
S220: Build a model for calculating its value from the values of all its correlated sensors by establishing a function with all the correlated sensor values; and
S230: Apart from the function for its calculated value, update the model with maximum threshold value that the measured value can deviate from the calculated value. This disclosure provides the example of these steps as follows.

The first sensor Sm can be a sensor whose condition is to be checked. The same method to determine whether a sensor is corrupted can be performed in turn on different sensors, but we use the first sensor as an example for illustration. The system may first identify one or more correlating sensors, denoted as sensors {Sm−2, Sm−1, Sm+3} as example, to the first sensor. The correlating sensors may have different level of correlation to the first sensor. For example, some correlating sensors may highly correlate to the first sensor, while other correlating sensors' measured value may have little correlation to the first sensor. As an example, the system may use existing Pearson Correlation or Mann Whitney U Test algorithms to identify the correlating sensors.

The system may determine correlation between the first sensor and the correlating sensors according to historical sensor values. With the correlation, the system may obtain a calculated value of the first sensor based on values of the correlating sensors and the correlation. As disclosed above, the system may obtain the measured value of the first sensor, and determining whether the first sensor is corrupted according to a difference between the calculated value and the measured value of the first sensor.

According to one embodiment of this disclosure, determining the correlation between the first sensor and the correlating sensors according to the historical sensor values may include: determining weights of each of the correlating sensors with respect to the first sensor.

According to one embodiment of this disclosure, determining the correlation between the first sensor and the correlating sensors according to the historical sensor values may include: determining weights of each of the correlating sensors with respect to the first sensor, such that a loss function of differences between historical calculated values of the first sensor and historical measured values of the first sensor is minimum.

According to one embodiment of this disclosure, the historical calculated values of the first sensor is a sum of historical sensor values of each correlating sensor multiplied by the weights of each correlating sensors.

According to one embodiment of this disclosure, determining the correlation between the first sensor and the correlating sensors according to the historical sensor values comprises deriving corresponding weights of each of the correlating sensors based on a multivariable regression method and the historical sensor values.

Specifically, the calculated value of the first sensor can be obtained via a weighted sum of values (either measured values or calculated values or both) of the correlating sensors. For example, the calculated value of the first sensor Sm,cal can be derived by the following equation:

$$Sm,cal = W1 \times Sm-2 + W2 \times Sm-1 + W3 \times Sm+3 \quad \text{equation (1)},$$

wherein W1, W2, W3 are the weights of the measured values Sm-2, Sm-1, Sm+3 of three correlating sensors. It should be noted that the calculated value of the first sensor can be derived from a non-liner combination of the values of the correlating sensors as well. This disclosure does not limit the way to derive the calculated value of the first sensors based on the values of the correlating sensors.

It should be noted that if a sensor has more correlating sensors, there may be more measured/calculated values of additional correlating sensors and more corresponding weights at the left-hand side of the equation (1). There is no limit on the number of correlating sensors, but some sensors' weights may be low enough to be disregarded. Briefly speaking, the calculated value of a to-be-checked sensor can be obtained by the weighted sum of the measured values of the correlating sensor regardless how many correlating sensors there are.

To obtain the correlation, the weights for the correlating sensors may need to be ascertained. The correlation can be determined according to the historical sensor values. For example, the historical sensors values can include the historical measured values of the first sensor and its correlating sensors. Via these data points, the system can obtain the weights/correlation of the correlating sensors by a Multi-variable Regression method. For example, a loss function can be defined as an average of sum of |Sm,cal (t)-Sm,mes (t)|, wherein t=t0, t1, t2 . . . tn, the times of the historical sensor value; Sm,cal (t) is the calculated value of the first sensor at time t according to the equation (1); and Sm,mes(t) is the measured value of the first sensor at time t. The system can calculate the weights of the correlating sensor with a goal to minimize the loss function, an average of sum of |Sm,cal (t)-Sm,mes(t)|, according the Multivariable Regression method. With the derived weights, the calculated values of the first sensor based on the values of the correlating sensors are closest to the measured values of the first sensor historically.

With the weights of the correlating sensor and the current measured values of the correlating sensors, the system can obtain the current calculated value of the first sensor. The system may further determine whether the first sensor is corrupted according to a difference between the calculated value and the measured value of the first sensor. For example, the system may set up a threshold, and determine whether the first sensor is corrupted according to the difference between the calculated value and measured value of the first sensor with respect to the threshold. For example, the system may deem that the first system is corrupted if the difference is larger and/or equal to the threshold.

Figure 3:
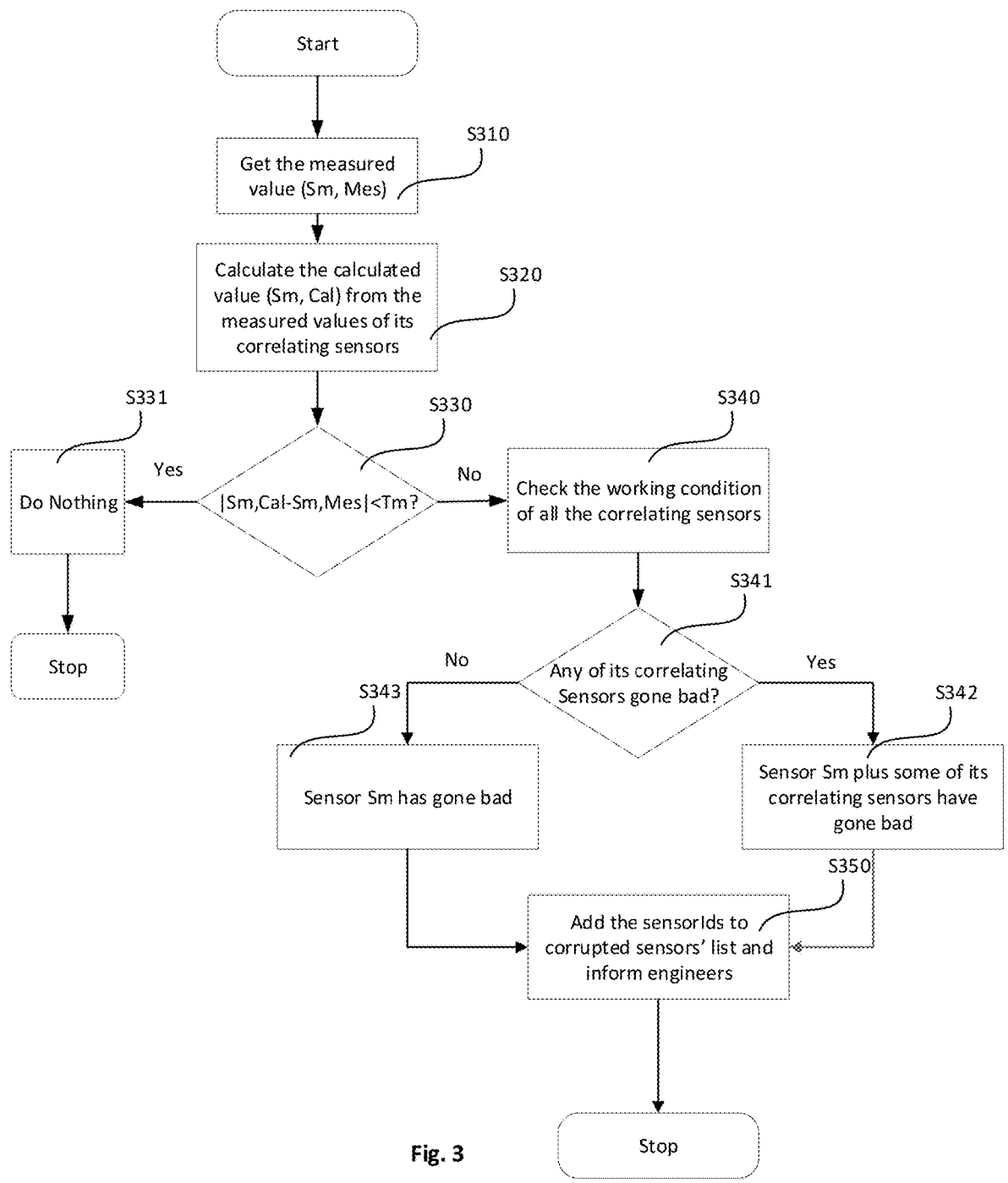
FIG. 3 shows a flow chart of the steps to detect corrupted sensors.

FIG. 3 shows a flow chart of the steps to detect the corrupted sensors. At S310, the measured value of a first sensor is obtained. At S320, the system may obtain the calculated value of the first sensor according to the function described above. At S330, the system determines the relationship of the difference between the calculated value and the measure value of the first sensor with respect to a threshold Tm. For example, if the difference is smaller than the threshold Tm, the system does nothing because it deems that the first sensor is not corrupted at S331. The system may further check another sensors' condition in the consortium according to some priority or rule set up by the system.

Figure 4:
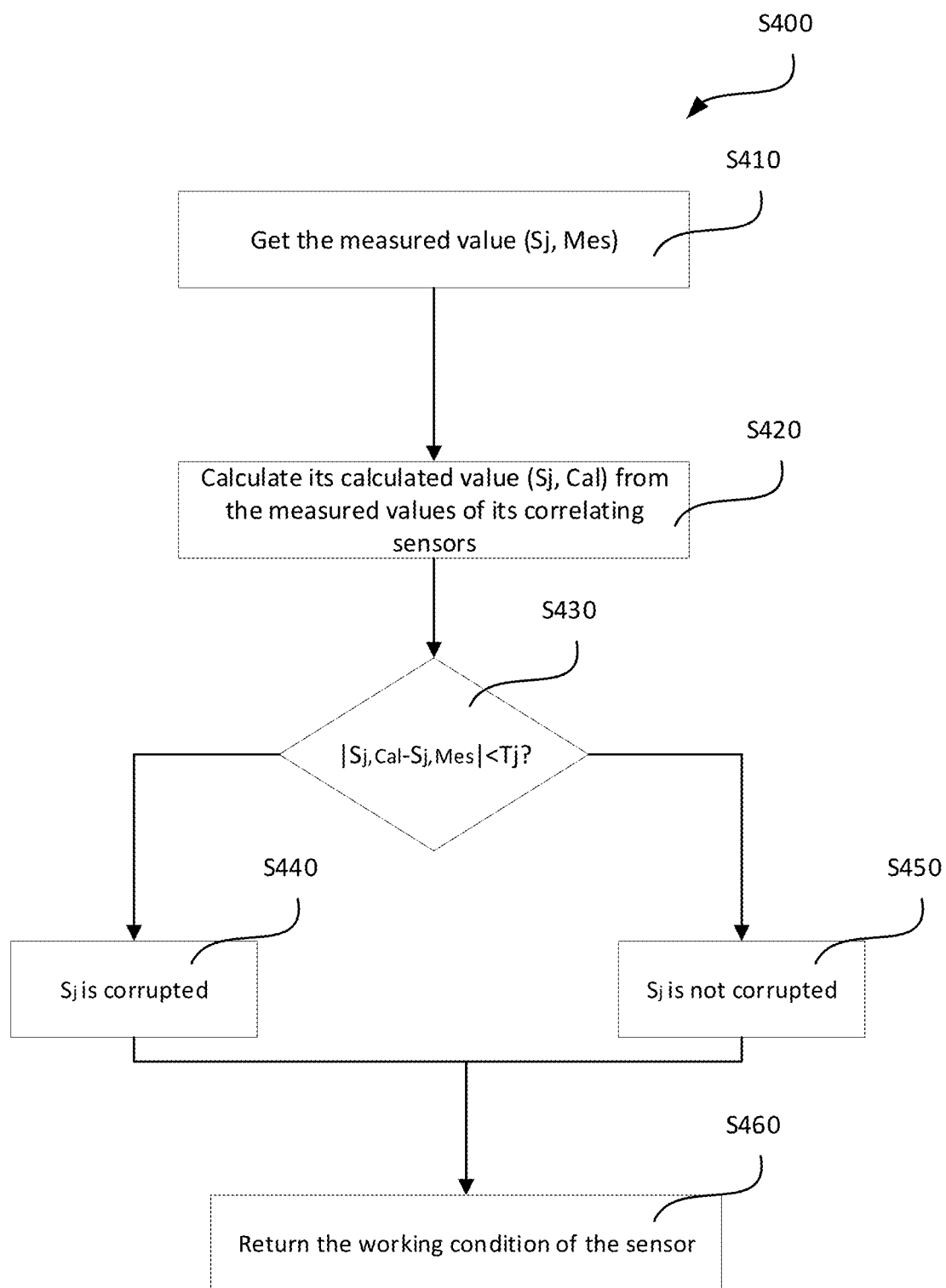
FIG. 4 shows a flow chart of recursive subfunction for checking the function of correlating sensors.

On the other hand, if the difference between the calculated value and the measure value of the first sensor is not smaller than the threshold Tm, the system may start to check the working conditions of some or all of the correlating sensors in a correlation to the first sensors at S340. The process to check the working condition of the correlating sensors, as illustrated in FIG. 4, can be the same approach used to check the working condition of the first sensor. For example, according to S400, the system can check the condition of the correlating sensors by determining a difference between a calculated value, Sj,cal, of a to-be-checked sensor calculated based on values of sensors correlating to the to-be-checked sensor and a measured value, Sj,mes, of the to-be-checked sensor as compared to a threshold value Tj to determine whether the to-be-checked sensor is malfunctioning. Specifically, at S410, the measured value of Sj,mes is collected. At S420, the calculated value, Sj,cal, of the sensor Sj is calculated. At S430, the difference between the calculated value and the measured value is determined to see if the difference is smaller than the threshold Tj. At S440 and S450, based on the difference, the system can determine if sensor Sj is corrupted. At S460, the system can return the result of determine the condition of the correlating sensor Sj. Via S400 in FIG. 4, if the system determines that any correlating sensor is also corrupted, the system may determine that the first sensor as well as the detected correlating sensor(s) are corrupted in S342 in FIG. 3.

In this case, the system may remove the corrupted correlating sensor from the current correlating sensor list, and use the other correlating sensors to recalculated the measured value of the first sensor. In this case, the system may recalculate the weights of the remaining correlating sensors as the elements in equation (1) has changed.

Alternatively or additionally, the system may use a calculated value of the corrupted correlating sensors to calculate the calculated value of the first sensor. For example, if the system finds Sm+3 sensor in equation (1) is corrupted, the system may use a "calculated" value of the Sm+3 sensor in equation (1) (instead of the "measured" value of Sm+3 sensor) to obtain the calculated value of Sm,cal. With the updated calculated value of the first sensor, the system can obtain a updated difference between the measured value of the first sensor and the calculated value of the first sensor, so as to redetermine whether the first sensor is actually corrupted, or it is due to the corruption of the correlating sensor(s).

At S343, if it is determined at S341 that the correlating sensors are all good, the system may determine that only the first sensor is corrupted. At S350, the system may take the record of the corrupted sensor(s) and/or inform engineers of the detection. The technician can replace corrupted sensor with a new sensor. As described in this disclose, once a new sensor replaces the original sensor, the system may rebuild the correlation model. For example, once a new sensor is added and in communication with the system (such as the system's gateway, server, hub, or any kind of controller), the process or rebuild the correlation model, including identifying the correlating sensors and reevaluating the weights of the corresponding correlating sensors, can be triggered. Also, the system may just remove the corrupted/replaced sensor from the list of correlating sensors, and use the remaining sensors to recalculate proper weights for the remaining correlating sensors. After a certain period when the historical data of the newly-added sensor(s) are collected, the system can add the new sensors to the list of correlating sensors and recalculate the weights for the new list of correlating sensors.

FIG. 4 shows a flow chart of recursive subfunction for checking the function of correlating sensors. The approach to check the working condition of a sensor can be performed in turn or in any sequence among the sensors in one or more IOT systems. The method described in FIG. 4 can also be used to check the working condition of the correlating sensors in S340 of FIG. 3. The checking process can also be performed regularly, in any preferred frequency, or in response to any events.

According to one embodiment of this disclosure, the method further includes updating a determination whether a sensor is corrupted according to at least one of the following factors or their combination:
  a sensing frequency of the first sensor;
  a criticality of the first sensor;
  a condition where the first sensor is installed;
  a maintenance schedule;
  an event of adding or removing a sensor;
  change of location of an existing sensor;
  change of grouping of a sensor; and
  change of context.

For example, a sensor has a higher sensing frequency may warrant a higher checking frequency. A sensor has a higher criticality may warrant a higher checking frequency. A sensor has a higher criticality can be a sensor who is highly correlates to other sensors. A sensor installed at a harsh environment may warrant a higher checking frequency. Checking of a sensor's working condition can be perform sooner than later after an event of adding or removing a sensor. In response to any changes as set up by the system, the dynamic model builder can rerun the program shortly to reshape the model of correlation.

According to one embodiment of this disclosure, at least one of a frequency of determining whether the first sensor is corrupted, a priority of determining whether the first sensor is corrupted, or a frequency of updating the one or more correlating sensors or the correlation is determined according to at least one of the following factors or their combination, including:
  a sensing frequency of the first sensor;
  a criticality of the first sensor;
  a condition where the first sensor is installed;
  a maintenance schedule;
  an event of adding or removing a sensor;
  change of location of an existing sensor;
  change of grouping of a sensor; and
  change of context.

According to one embodiment of this disclosure, the method may further include disabling the first sensor or disregarding an incoming measured value of the first sensor after determining that the first sensor is corrupted. For example, once it is determined that the first sensor is corrupted, the system may disable the first sensor so the first sensor is not transmitted new measured value to a gateway. It may also disregard the new measured value of the first sensor, such that even there are incoming measured value of the corrupted sensor, the unreliable measurement will not come into the system and its' calculation.

According to one embodiment of this disclosure, the method may further include replacing the incoming measured value of the first sensor with a calculated incoming value of the first sensor based on incoming values of the correlating sensors. In one implementation, the replacement would be maintained until a corrective action is taken. For example, once it is determined that the first sensor is corrupted, the system may further use the calculated value of the first sensor (calculated via the values of correlating sensors) to replace the measured value of the first sensor. Here, the calculated value of the first sensor can be, likewise, the weighted sum of the correlating sensors as explained above. If a sensor is corrupted, the calculated value may be more reliable than the measured value.

According to one embodiment of this disclosure, the method further includes attempting to fix the first sensor by updating a program, such as firmware, of the first sensor. The system may inform of the technicians of the failure event. The technician may try to manually fix the system by updating the software, firmware, and/or hardware of the corrupted sensors (e.g., by replacing the corrupted sensor with a new sensor).

According to one embodiment of this disclosure, the method further includes updating a list of the correlating sensors and/or a threshold value that the measured value of the first sensor may deviate from the calculated value of the first sensor. The system can regularly update the correlation models among different sensors regularly (e.g., every three months), randomly, in response to any certain event, and/or following any preset rules as appropriate. The update of the correlation model includes update of a list of the correlating sensors of a certain sensor and/or update of the corresponding weights of the correlating sensors. The update of the models can be performed in a dynamic manner. For example, the model can be updated when any sensor is added or removed from the consortium, when the association of the sensors is changed, or when the location of a sensor is changed. The sensors used in this disclosure may include a GPS, so the location of the sensor can be determined. For example, based on the location information provided by the GPS, the system, such a control hub, can understand a sensor is moved by comparing the original location and the new location. As described in other portion of this disclosure, the change of the location of a sensor can be a triggering event to prompt the system to update the dynamic correlation models, such as to update the weights of the correlating sensors or to update the list of the correlating sensors. Additionally, the system can update the threshold value that the measured value of the first sensor may deviate from the calculated value of the first sensor regularly, in response to any event, or as needed.

Figure 5:
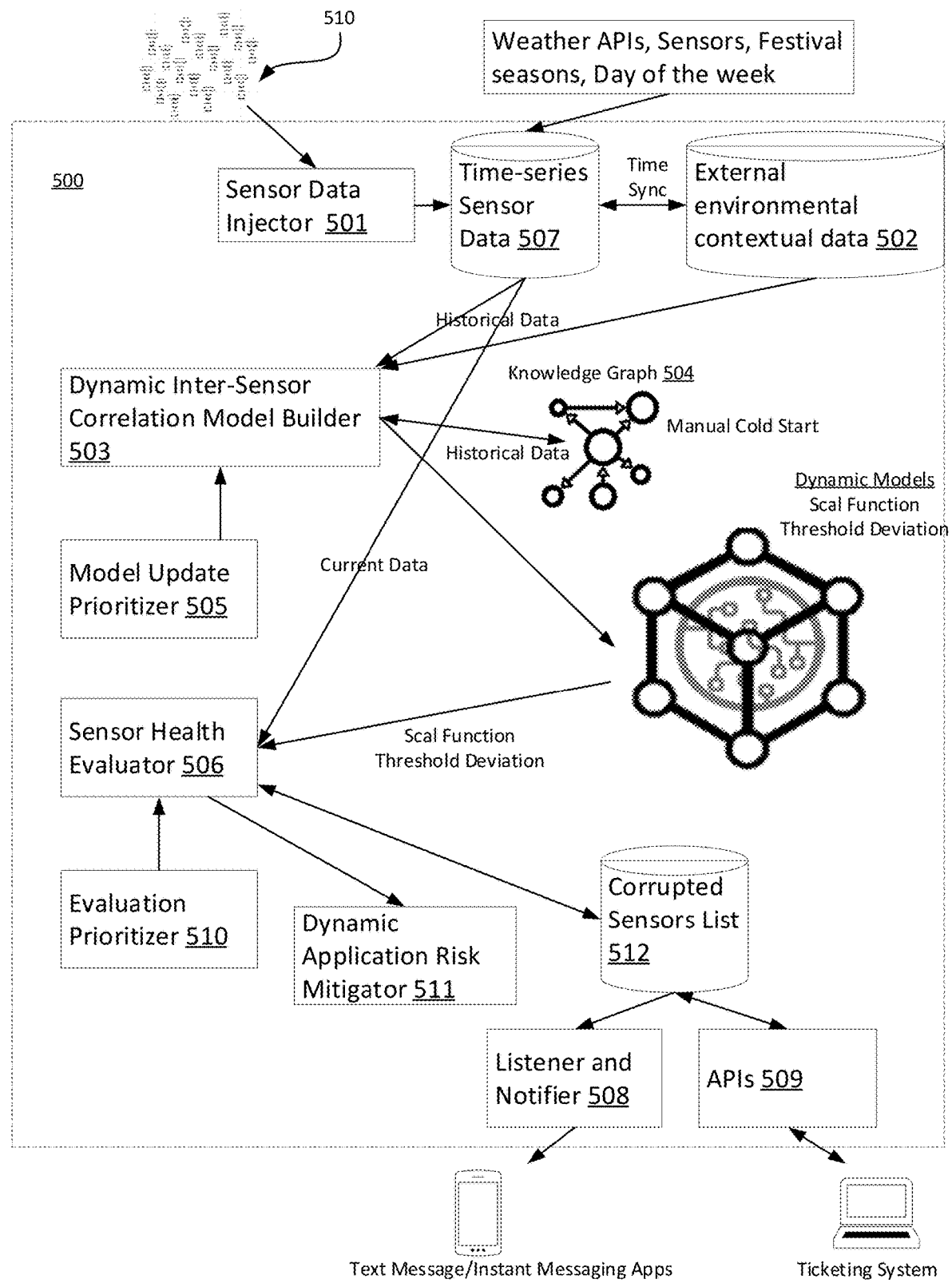
FIG. 5 shows a sensor management system applicable to perform the methods disclosed in this disclosure.

FIG. 5 shows a sensor management system 500 applicable to perform the methods disclosed in this disclosure. The system may include sensor data injector 501 configured to receive the incoming measured or calculated values of sensor(s) 510. The sensor data injector 501 can be a kind of communication ports used to receive the communication from the sensors 510. The system 500 may also include database or data structure 502 used to store the sensors data or corresponding environmental, contextual data. The system 500 may also include dynamic inter-sensor correlation model builder 503, used to build the correlation model in a dynamic manner, such as the function between different sensors as indicated in equation (1). The dynamic inter-sensor correlation model builder 503 may rebuild the models in response to different events or according to the priority discloses in this disclosure. The system 500 may also include a manually set up knowledge graph 504. The knowledge graph 504 can be used to establish the dynamic models at the beginning. For example, the system 500 can assume a correlation model based on the knowledge graph 504. Overtime and starting from the assumed correlation model, the system 500 can gradually update the correlation model in a dynamic manner. The system 500 may also include a model update prioritizer 505, the model update prioritizer 505 can be used to prioritize the update of the sensor models or correlation models according to different factors, such as a sensing frequency of the first sensor; a criticality of the first sensor; a condition where the first sensor is installed; a maintenance schedule; an event of adding or removing a sensor; change of location of an existing sensor; change of grouping of a sensor; and change of context.

The system 500 in FIG. 5 may also include a sensor health evaluator 506, used to determine whether any sensor is corrupted. The sensor health evaluator 506 can use the methods disclosed herein to conduct the evaluation. The sensor health evaluator 506 can determine the priority of the evaluation according to the evaluation prioritizer 510 based on different factors, such as a sensing frequency of the first sensor; a criticality of the first sensor; a condition where the first sensor is installed; a maintenance schedule; an event of adding or removing a sensor; change of location of an existing sensor; change of grouping of a sensor; and change of context.

The system 500 may also include a database or a data structure 507 to save the lists of the corrupted sensor(s). The system 500 may also include a listener and a notifier 508 used to notify proper persons if there is any update to the database by sending notifications to the user's devices via, for example, text messages, instant messaging apps, or ticketing systems. The API(s) 509 may allow external access and manage of the sensors. The system 500 may include a Dynamic Application Risk Mitigator 511, configured to handle corrupted sensors by, for example, update the firmware or software or replace the values of the corrupted sensors. The identity of the corrupted sensors can be saved in a database or data structure 512.

Figure 6:
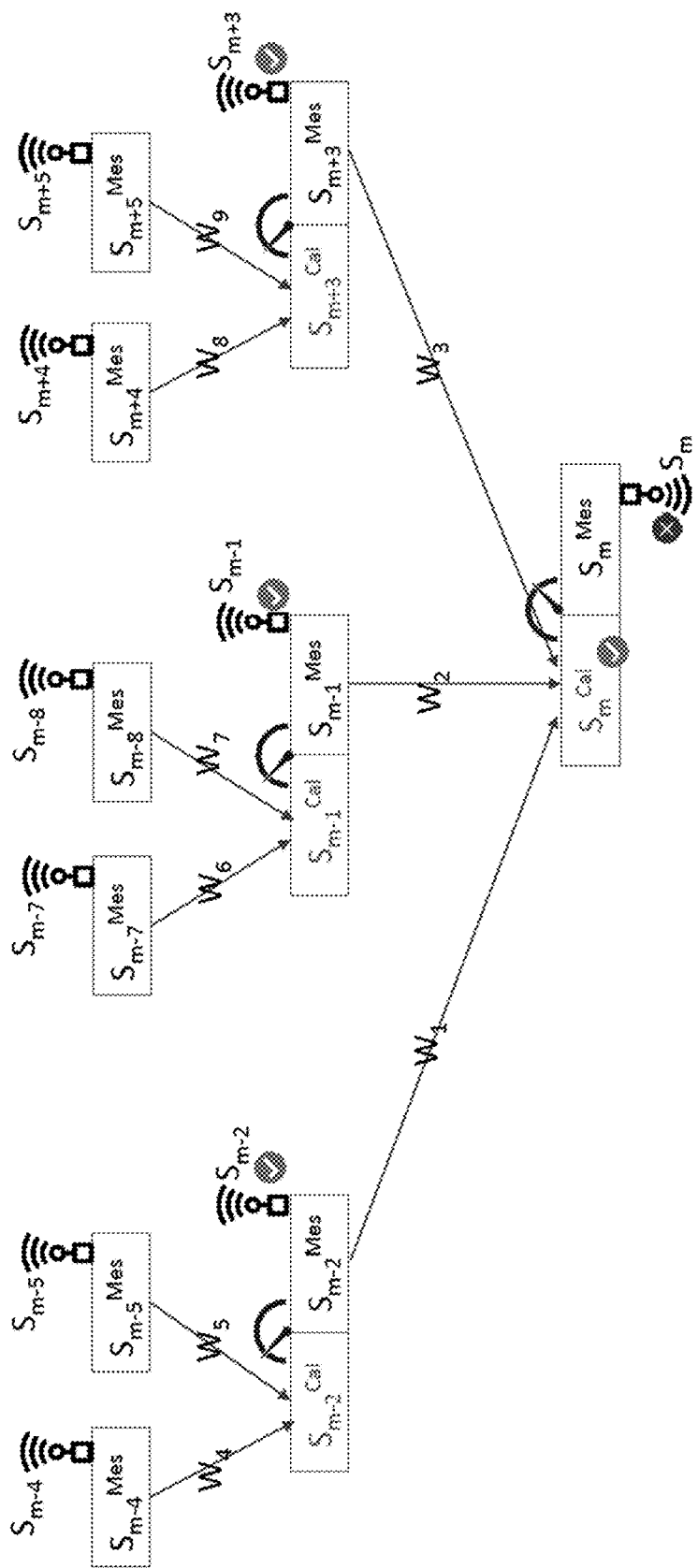
FIG. 6 illustrates a hierarchy of a plurality of sensors.

FIG. 6 illustrates a hierarchy of a plurality of sensors. In this case, sensor Sm−2 has two correlating sensors Sm−4 and Sm−5; sensor Sm−1 has two correlating sensors Sm−7 and Sm−8; sensor Sm+3 has two correlating sensors Sm+4 and Sm5; finally, sensor Sm has three correlating sensors Sm−2, Sm−1, and Sm3. According to one embodiment, the system may first establish the hierarchy of the co-relationship of a plurality of sensors. Further, the system may first check the working conditions of the sensors at the middle layer, including sensors Sm−2, Sm−1, and Sm+3, with the sensor values of the sensors at the top layer. Then, the system may use the sensor values of the sensors at the middle layer, including sensors Sm−2, Sm−1, and Sm+3, to check the working condition of sensor Sm at the bottom layer according to the method disclosed in this disclosure.

Figure 7:
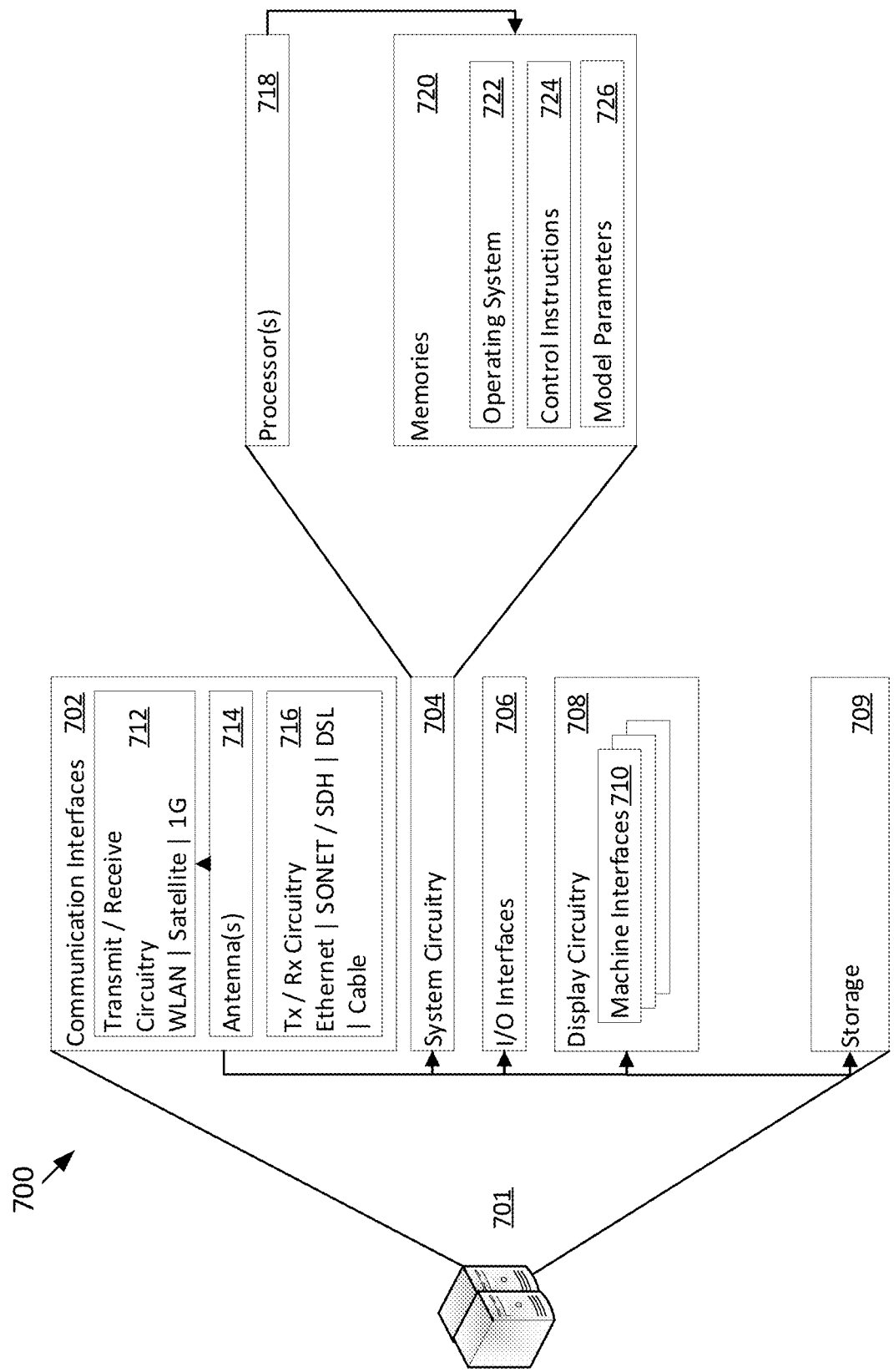
FIG. 7 shows one embodiment where the sensor management system of FIG. 5 and sensors as disclosed are implemented by computing resources.

FIG. 7 shows one embodiment of system structure 700 where the sensor management system 500 at FIG. 5 and sensors as disclosed are implemented by computing resources such as computers 701. The system 500 may be implemented by multiple such computers. These computers may be dedicated physical machines or may be virtual machines. They may be located in one geographic location or may be geographically distributed.

Each computer 701 may include communication interfaces 702, system circuitry 704, input/output (I/O) interfaces 706, storage 709, and display circuitry 708 that generates machine interfaces 710 locally or for remote display. The machine interfaces 710 and the I/O interfaces 706 may include GUIs, touch sensitive displays, voice or facial recognition inputs, buttons, switches, speakers and other user interface elements. Additional examples of the I/O interfaces 706 include microphones, video and still image cameras, headset and microphone input/output jacks, Universal Serial Bus (USB) connectors, memory card slots, and other types of inputs. The I/O interfaces 706 may further include magnetic or optical media interfaces (e.g., a CDROM or DVD drive), serial and parallel bus interfaces, and keyboard and mouse interfaces.

The communication interfaces 702 may include wireless transmitters and receivers ("transceivers") 712 and any antennas 714 used by the transmitting and receiving circuitry of the transceivers 712. The transceivers 712 and antennas 714 may support Wi-Fi network communications, for instance, under any version of IEEE 802.11, e.g., 802.11n or 802.11ac. The communication interfaces 702 may also include wireline transceivers 716. The wireline transceivers 716 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 709 may be used to store various initial, intermediate, or final data or model for object/landmark recognition, segmentation, and further data analytics. The storage 709 may further store training aerial images, land maps, and land registry data used for training and deployment of the object/landmark recognition and segmentation models, and various data analytics based on the output of the models. The storage 709 may be centralized or distributed. For example, it may be hosted remotely by a cloud computing service provider.

The system circuitry 704 may include hardware, software, firmware, or other circuitry in any combination. The system circuitry 704 may be implemented, for example, with one or more systems on a chip (SoC), application specific integrated circuits (ASIC), microprocessors, discrete analog and digital circuits, and other circuitry. The system circuitry 704 is part of the implementation of any desired functionality related to the training, deployment, and data analytics of the object/landmark recognition and segmentation models and systems. As just one example, the system circuitry 704 may include one or more processors 718, such as instruction processors, and memories 720. The memories 720 may store, for example, control instructions 724 and an operating system 722. The system circuitry 704 may further include specific processors 718 (such as GPUs and other artificial intelligence processors) for implementing the CNN models. The memories 720 may correspondingly store model parameters 726 for the CNN models. The memories 720 may be standalone, or may alternatively be embedded with the processors 718 for fast data access. In one implementation, the processors 718 execute the control instructions 724, the operating system 722, and implement the CNN models to carry out any desired functionality related to recognition, segmentation, and data analytics of the system 500.

According to one embodiment of this disclosure, a computer system is provided. The computer system is configured to perform any and all methods or steps, or their combination as disclosed in this disclosure.

According to one embodiment of this disclosure, a non-transitory computer readable medium is provided. The non-transitory computer readable medium saves one or more programs, the one or more programs, when executed by one or more processors, causing a computer system to perform any and all methods or steps, or their combination as disclosed in this disclosure.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method for detection of a corrupted sensor comprising:
   identifying, by one or more processors, one or more correlating sensors to a first sensor;
   dynamically determining, by the one or more processors, a correlation between the first sensor and the correlating sensors according to historical sensor values using an inter sensor correlation model, wherein each of the correlating sensors have a different level of correlation with the first sensor;
   obtaining, by the one or more processors, a calculated value of the first sensor based on values of the correlating sensors and the correlation;
   obtaining, by the one or more processors, a measured value of the first sensor;
   determining, by the one or more processors, whether a difference between the calculated value and the measured value of the first sensor is greater than and/or equal to a threshold value;
   when the difference between the calculated value and the measured value of the first sensor is greater than and/or equal to the threshold value, checking, by the one or more processors, a working condition of each of the correlating sensors;
   determining, by the one or more processors, whether the first sensor is corrupted based on the working condition of each of the correlating sensors; and
   updating, by the one or more processors, one of a firmware or software of the first sensor upon determining that the first sensor is corrupted.

2. The method of claim 1, wherein determining the correlation between the first sensor and the correlating sensors according to the historical sensor values using the inter sensor correlation model comprises:
   determining weights of each of the correlating sensors with respect to the first sensor.

3. The method of claim 1, wherein determining the correlation between the first sensor and the correlating sensors according to the historical sensor values using the inter sensor correlation model comprises:
   determining weights of each of the correlating sensors with respect to the first sensor, such that a loss function of differences between historical calculated values of the first sensor and historical measured values of the first sensor is minimum.

4. The method of claim 3, wherein the historical calculated values of the first sensor is a sum of historical sensor values of each correlating sensor multiplied by the weights of each correlating sensors.

5. The method of claim 1, wherein determining the correlation between the first sensor and the correlating sensors according to the historical sensor values comprises deriving corresponding weights of each of the correlating sensors based on a multivariable regression method and the historical sensor values.

6. The method of claim 1, wherein checking the working condition of each of the correlating sensors comprises determining a difference between a calculated value of a to-be-checked sensor calculated based on values of sensors correlating to the to-be-checked sensor and a measured value of the to-be checked sensor as compared to a threshold value to determine whether the to-be-checked sensor is malfunctioning.

7. The method of claim 6, wherein checking the working condition of each of the correlating sensors further comprising checking the working condition of the rest of the correlating sensors other than the to-be-checked sensor.

8. The method of claim 1, wherein at least one of a frequency of determining whether the first sensor is corrupted, a priority of determining whether the first sensor is corrupted, or a frequency of updating the one or more correlating sensors or the correlation is determined according to at least one of the following factors or their combination, including:
   a sensing frequency of the first sensor;
   a criticality of the first sensor;
   a condition where the first sensor is installed;
   a maintenance schedule;
   an event of adding or removing a sensor;
   change of location of an existing sensor;
   change of grouping of a sensor; and
   change of context.

9. The method of claim 1, further comprising:
   before obtaining the calculated value of the first sensor based on values of the correlating sensors and the correlation, checking whether at least one of the correlating sensors is corrupted.

10. The method of claim 1, further comprising at least one of:
    disabling the first sensor or disregarding an incoming measured value of the first sensor after determining that the first sensor is corrupted; or
    replacing the incoming measured value of the first sensor with a calculated incoming value of the first sensor based on incoming values of the correlating sensor.

11. The method of claim 1, further comprising updating a list of the correlating sensors and/or the threshold value that the measured value of the first sensor may deviate from the calculated value of the first sensor.

12. A computer system, comprising:
    a memory storing one or more programs; and
    one or more processors, configured to execute the one or more programs to perform operations comprising:
      identifying one or more correlating sensors to a first sensor;
      dynamically determining correlation between the first sensor and the correlating sensors according to historical sensor values using an inter sensor correlation model, wherein each of the correlating sensors have a different level of correlation with the first sensor;
      obtaining a calculated value of the first sensor based on values of the correlating sensors and the correlation;
      obtaining a measured value of the first sensor;
      determining a difference between the calculated value and the measured value of the first sensor is greater than and/or equal to a threshold value;
      when the difference between the calculated value and the measured value of the first sensor is greater than and/or equal to the threshold value, checking a working condition of each of the correlating sensors;
      determining whether the first sensor is corrupted based on the working condition of each of the correlating sensors; and
      updating one of a firmware or software of the first sensor upon determining that the first sensor is corrupted.

13. The computer system of claim 12, wherein the one or more processors are configured to determine the correlation between the first sensor and the correlating sensors according to the historical sensor values using the inter sensor correlation model by:
    determining weights of each of the correlating sensors with respect to the first sensor, such that a loss function of differences between historical calculated values of the first sensor and historical measured values of the first sensor is minimum.

14. The computer system of claim 13, wherein the historical calculated values of the first sensor is a sum of historical sensor values of each correlating sensor multiplied by the weights of each correlating sensors.

15. The computer system of claim 12, wherein the one or more processors are configured to determine the correlation between the first sensor and the correlating sensors according to the historical sensor values by:
    deriving corresponding weights of each of the correlating sensors based on a multivariable regression method and the historical sensor values.

16. The computer system of claim 12, wherein at least one of a frequency of determining whether the first sensor is corrupted, a priority of determining whether the first sensor is corrupted, or a frequency of updating the one or more correlating sensors or the correlation is determined according to at least one of the following factors or their combination, including:
    a sensing frequency of the first sensor;
    a criticality of the first sensor;
    a condition where the first sensor is installed;
    a maintenance schedule;
    an event of adding or removing a sensor;
    change of location of an existing sensor;
    change of grouping of a sensor; and
    change of context.

17. The computer system of claim 12, wherein the one or more processors are further configured to before obtaining the calculated value of the first sensor based on values of the correlating sensors and the correlation, check whether at least one of the correlating sensors is in a fault condition.

18. A non-transitory computer readable medium, saving one or more programs, the one or more programs, when executed by one or more processors, causing a computer system to perform steps comprising:
    identifying one or more correlating sensors to a first sensor;
    dynamically determining correlation between the first sensor and the correlating sensors according to historical sensor values using an inter sensor correlation model, wherein each of the correlating sensors have a different level of correlation with the first sensor;
    obtaining a calculated value of the first sensor based on values of the correlating sensors and the correlation;
    obtaining a measured value of the first sensor;
    determine whether a difference between the calculated value and the measured value of the first sensor is greater than and/or equal to a threshold value;
    when the difference between the calculated value and the measured value of the first sensor is greater than and/or equal to the threshold value, checking a working condition of each of the correlating sensors;
    determining whether the first sensor is corrupted based on the working condition of each of the correlating sensors; and
    updating one of a firmware or software of the first sensor upon determining that the first sensor is corrupted.

* * * * *